Feb. 20, 1940. R. M. HICKS 2,191,234
NUMERICAL COMPARING SYSTEM
Filed Jan. 2, 1937 5 Sheets-Sheet 1

INVENTOR
RAYMOND M. HICKS
BY M. J. Reynolds
ATTORNEY

Feb. 20, 1940.   R. M. HICKS   2,191,234
NUMERICAL COMPARING SYSTEM
Filed Jan. 2, 1937   5 Sheets-Sheet 2
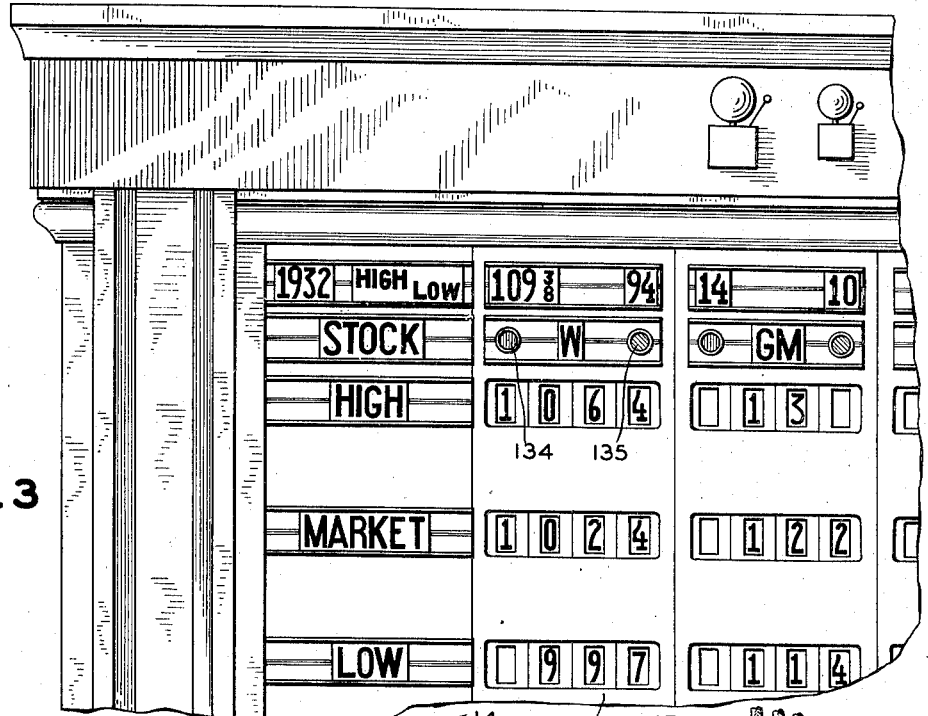
FIG. 3
FIG. 4
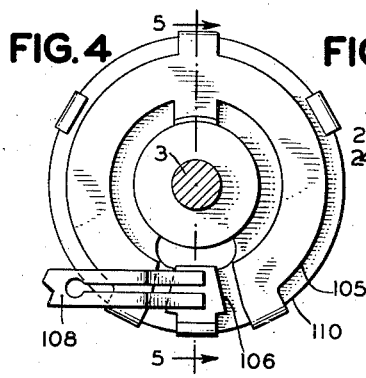
FIG. 6
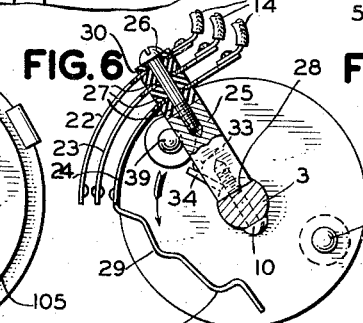
FIG. 8
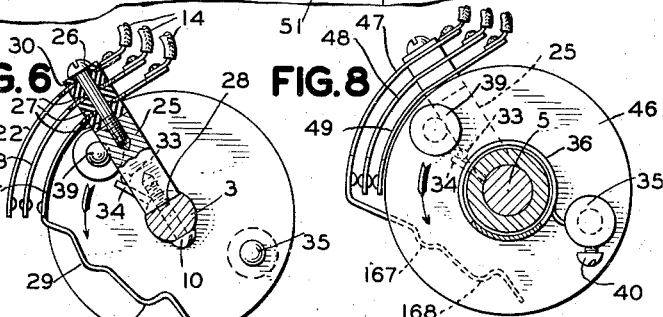
FIG. 5
FIG. 7
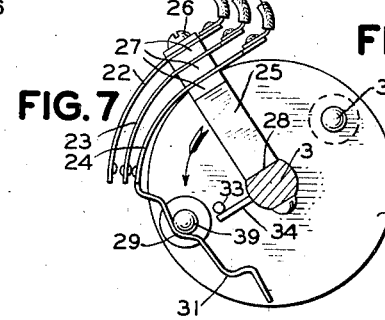
FIG. 9
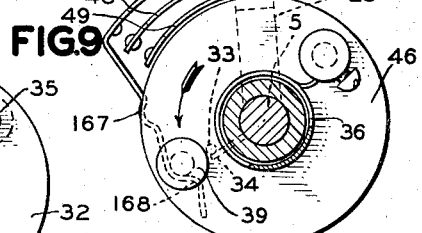
INVENTOR
RAYMOND M. HICKS
BY
M. J. Reynolds
ATTORNEY Feb. 20, 1940.   R. M. HICKS   2,191,234
NUMERICAL COMPARING SYSTEM
Filed Jan. 2, 1937   5 Sheets-Sheet 3

INVENTOR
RAYMOND M. HICKS
BY
M. J. Reynolds
ATTORNEY

Patented Feb. 20, 1940

2,191,234

UNITED STATES PATENT OFFICE 2,191,234

NUMERICAL COMPARING SYSTEM

Raymond M. Hicks, Plainfield, N. J., assignor to The Teleregister Corporation, New York, N. Y., a corporation of Delaware Application January 2, 1937, Serial No. 118,774

6 Claims. (Cl. 177—311)

This invention relates to a numerical comparing system and particularly to means for comparing a number which may comprise a plurality of digits with another number unknown to the operator and additional means to inform the operator of the numerical relation of the numbers so compared.

For instance, in the limit order system of a brokerage office the various customers have orders on file with the broker to sell shares of a stock when it has reached a predetermined high price or to buy a certain number of shares of a stock when the price thereof has decreased to a predetermined value. It is the present practice in systems of this character for the limit order clerk to observe the prices of stocks as they appear upon the ticker tape and compare these prices mentally with the buy and sell orders which have been assigned to him.

With the present rapid trading of securities, it is difficult for the clerk to keep up with the quotations as they appear on the tape of the modern high speed ticker and accurately compare these quotations with the buy and sell orders without failing to execute orders at the time when the stock has reached or passed the price on the order slip. An error of this character is often costly to the broker as he is held responsible by the customer for the proper execution of the customer's orders. Similarly in the accounting system of a department store or the like it is the practice to give charge account customers a credit rating and the amount which a customer may charge during a given period is limited by the amount of the rating. The usual method is to have the clerk when making a sale, telephone the bookkeeper or accountant, who investigates the customer's ledger sheet and reports back to the clerk whether or not the charge may be made. Similarly in banks and other institutions the teller or cashier may wish to know the relation between the depositor's balance and a check or other paper presented for payment.

One of the advantages of the present invention is to provide a system for use in such cases to enable the clerk or cashier to make such comparison quickly, simply and accurately.

Another object is to provide means for comparing a number with another number whose value has been previously determined to ascertain whether the first number is numerically higher, lower or the same as the number having the previously determined value, and a still further object is to compare a number with two previously determined numbers having different values to ascertain whether the first number is higher than the higher of the two previously determined numbers, lower than the lower one thereof, intermediate the two or the same as either.

More specifically one of the objects is to provide a limit order device for use by brokers and others by which the prices of stocks, bonds, commodities or the like which fluctuate in value may be compared with the brokers buy or sell limit order or with a previously established high or low price of the commodity to ascertain whether the limit order price has been reached or exceeded, or whether a new high or low price has been established.

Numerous other advantages will be apparent from the detailed description of the invention given hereinafter.

In accordance with one embodiment of my invention, I provide each clerk or other person desiring to obtain a comparison with a keyboard or similar selectively operable device by means of which a previously determined number may be selected from a plurality of previously determined numbers and compared with a second number, the clerk's equipment comprising a signal or other indicating device associated therewith for immediately indicating to the clerk the numerical relation of the numbers to each other. Associated with the clerk's position is a comparing mechanism responsive to the number set up on the keyboard for comparing the same with a number set up by an operator in the comparing mechanism and for operating the indicating device in accordance with the result of such comparison.

The operator referred to may be remotely situated with respect to the clerk's transmitting equipment, which comprises a rotatable dial or other selecting device for selecting a stock or other item to be set up on the comparing device and a transmitter for transmitting the current price of the stock selected by the selecting device. This operator is also provided with a ticker and transmits the prices of stocks as they appear on the ticker tape or as transmitted to the operator by telephone from the floor of the exchange or by other means.

The invention will best be understood by reference to the accompanying drawings in which:

Fig. 3 shows a fragment of a quotation board comprising a plurality of groups of the comparing devices of Figs. 1 and 2.

Fig. 4 is a detailed view of the commutator taken along the line 4—4 of Fig. 1.

Fig. 5 is a view partly in section taken along the line 5—5 of Fig. 4.

Fig. 6 shows the circuit connections established when the setting of a High indicator is numerically greater than the setting of the corresponding Market indicator.

Fig. 7 is a view of the contact arrangement taken along the line 7—7 of Fig. 1.

Fig. 8 shows the contact arrangement when the setting of a Low indicator is numerically less than the setting of the corresponding Market indicator.

Fig. 9 is a view of the contact arrangement taken along the line 9—9 of Fig. 1.

Figures 1, 2:
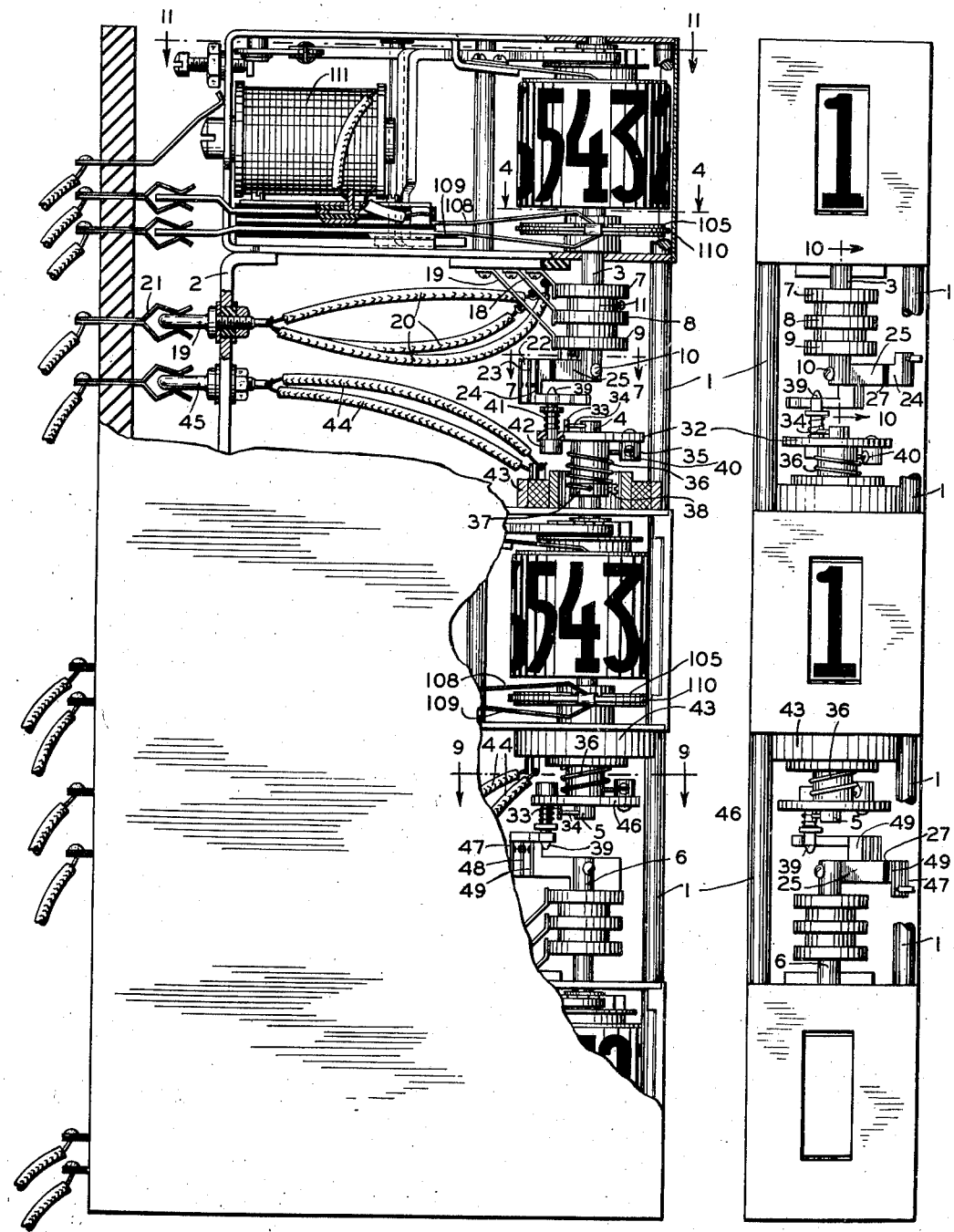
Fig. 1 shows a fragmentary view partly in section of one of the comparing devices.
Fig. 2 is a front view of the device of Fig. 1.

Referring first to Figs. 1 and 2, I have shown one of the comparator units such as the hundreds unit of the stock W of Fig. 3. This unit comprises three rotatable indicator units, preferably of the type disclosed in the patent to M. L. Haselton No. 2,049,499 issued August 4, 1936. These three indicator units are held in spaced relation to one another by the studs 1 and suitable spacing plates 2 with the drum shafts of the indicator units in alignment with one another. The drum shaft of the upper indicator unit has an extension 3 projecting downwardly from the frame of this unit, the shaft of the second indicator unit is continued upwardly by an extension 4 and downwardly by an extension 5 and the shaft of the lower indicator unit is continued upwardly by the extension 6.

Figure 10:
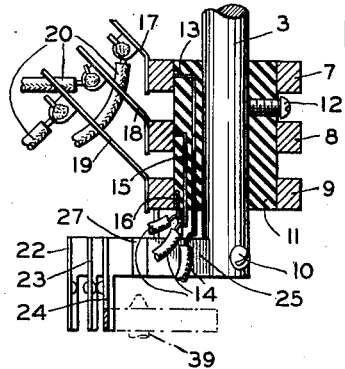
Fig. 10 is a view partly in section of the circuit connections taken on the line 10—10 of Fig. 2.
Figure 11:
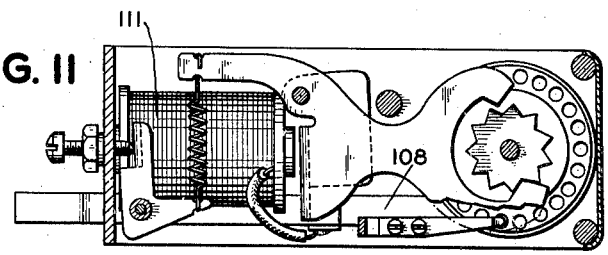
Fig. 11 is a view of the High indicator unit taken along the line 11—11 of Fig. 1.

The shaft 3 has mounted thereon three slip rings 7, 8 and 9, Figs. 1 and 10, insulated therefrom and from one another. These slip rings are supported by an insulated collar 11 securely held to the shaft by the screw 12.

As clearly shown on Fig. 10, the slip ring 7 has connected thereto a conducting strip 13 to which is attached one of the conductors 14. Similarly the slip rings 8 and 9 are in connection with conducting strips 15 and 16 respectively, each strip having connected thereto one of the conductors 14. Brushes 17, 18 and 19, having attached thereto the wires 20, engage slip rings 7, 8 and 9 respectively and thus complete circuits between the wires 20 and the wires 14. The wires 20 extend to terminals 19 which engage the slip connections 21. The wires 14, as shown on Fig. 6, terminate on springs 22, 23 and 24, which springs are securely clamped to the arm 25 by the screw 26 and insulated therefrom and from one another by insulating washers 27 and 30. The arm 25 is attached to shaft 3 by the screw 10 which engages the arm 25 and holds it securely against the flat portion 28 of the shaft 3 so that the entire spring assembly is rotated by the shaft 3 as the indicator unit operates.

The spring 24 is provided with a first depression 29, a second depression 31 and a bent out portion, the purpose of which will be apparent as the description proceeds.

Referring again to Fig. 1 the shaft 4 has loosely mounted thereon an insulating collar 32 provided with a pin 33 adapted to engage the arm 34 which is attached to the shaft 4. The collar 32 is provided with a stud 35 to which is attached one end of the spring 36 by means of the screw 40. The other end of this spring is attached to the collar 37 which is clamped to the shaft 4 by the screw 38. The spring 36 normally holds the pin 33 against the arm 34 in the manner indicated on the drawings.

The pin 39 is made of magnetic material adapted to slide freely through the collar 32 and is normally urged against the collar by the spring 41 so that the shoulder 42 rests against the lower surface of the collar 32. Immediately below the pin 41 is a circular electromagnet 43 adapted upon energization to attract the pin 39 and thus prevent it from engaging the spring 24. The electromagnet 43 is connected by the wires 44 to the terminals 45 which engage suitable slip connections as shown on Fig. 1.

The construction of the collar 46 and the method of mounting upon the shaft 5 is similar to the arrangement employed for the collar 32.

The method of mounting the springs 47, 48 and 49 upon the shaft 6, Fig. 1, is similar to the arrangement employed in mounting the springs 22, 23 and 24. As clearly shown on Fig. 8, springs 47, 48 and 49 are normally in engagement with one another. When the setting of the lowermost or Low indicator is less than the corresponding intermediate or Market indicator, these springs take the positions shown on Fig. 9 with the pin 39 engaging the depression 168 and the spring 47 is forced away from the spring 48 so that none of the springs 47, 48 and 49 are in contact with one another. The depression 168 is formed so that the pin 39 is held in engagement therewith should the setting of the Low indicator be numerically more than one unit less than the corresponding Market indicator setting. As the Market indicator advances beyond the first digit position one unit numerically greater than the setting of the Low indicator, the movement of the collar 46 is arrested by the engagement of the pin 39 with the depression 168 and the pin 33 moves away from the arm 34 as the Market indicator continues its movement. The operation of the circular magnet 43 withdraws the pin 39 during the restoration cycle of the unit, thereby causing the spring 36 to again position the pin 33 against the arm 34.

When the setting of the market indicator is numerically one or more units greater than the setting of the corresponding High indicator, the upper pin 39 is in engagement with the depression 31 and the springs 22, 23 and 24 of the unit are forced into engagement with one another.

There is one comparator unit such as shown on Figs. 1 and 2 for each digit and fraction of the stock price and a stock price having three digits and a fraction as, for example, the stock W shown on Fig. 3 requires four comparator units, there being one for the hundreds, tens, units and fractions digits respectively. The indicators of the uppermost row display the High or selling price of the stock and the indicators of the bottom row display the Low price or the price at which the stock is to be bought. The intermediate row of indicators display the current or Market quotation of this stock. Each group of comparator units is covered by a mask 51, Fig. 3, having apertures therein through which the indicator settings are visible.

Figure 16:
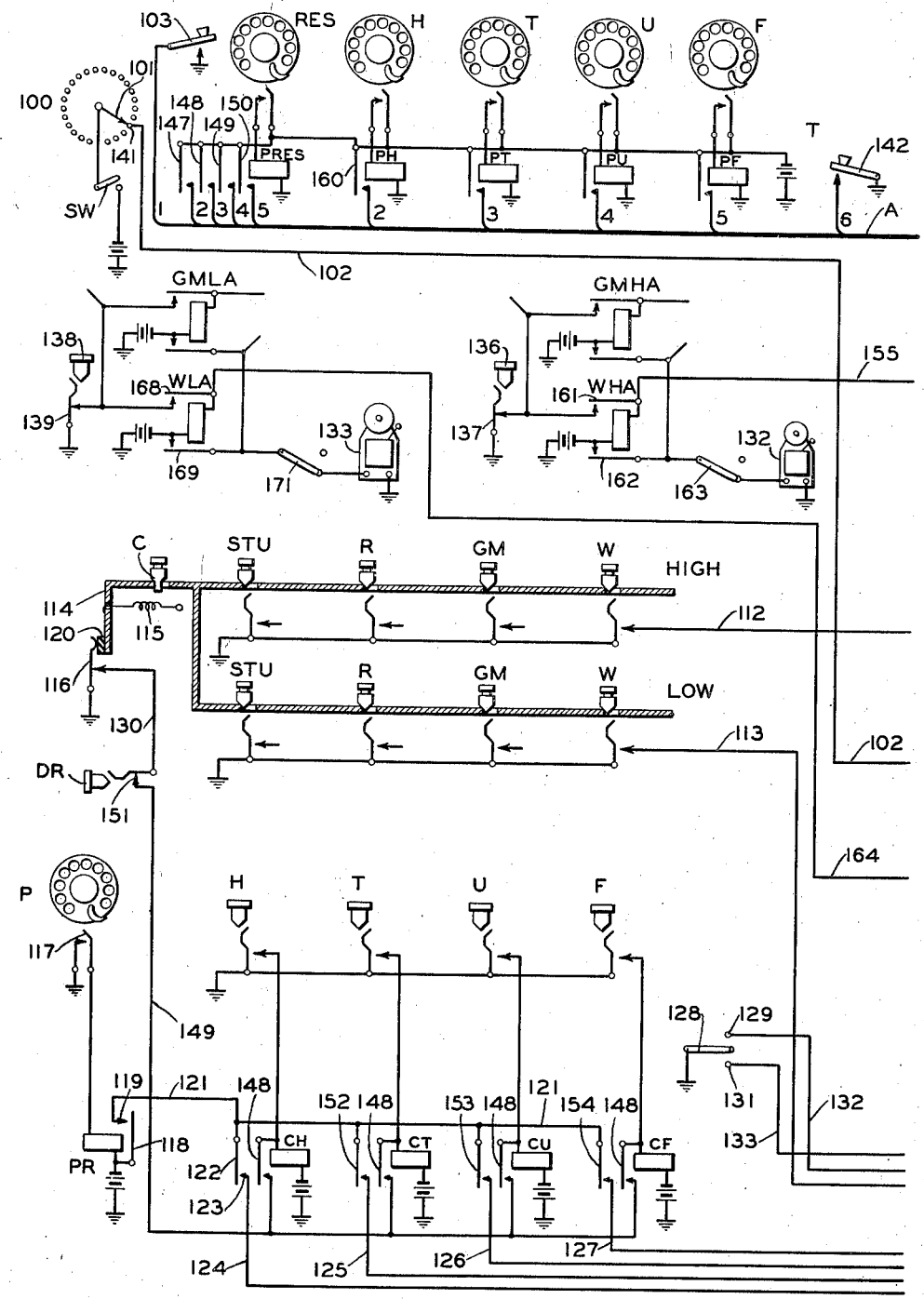
Figs. 16 and 17 show the circuits and apparatus for a complete system.
Figure 17:
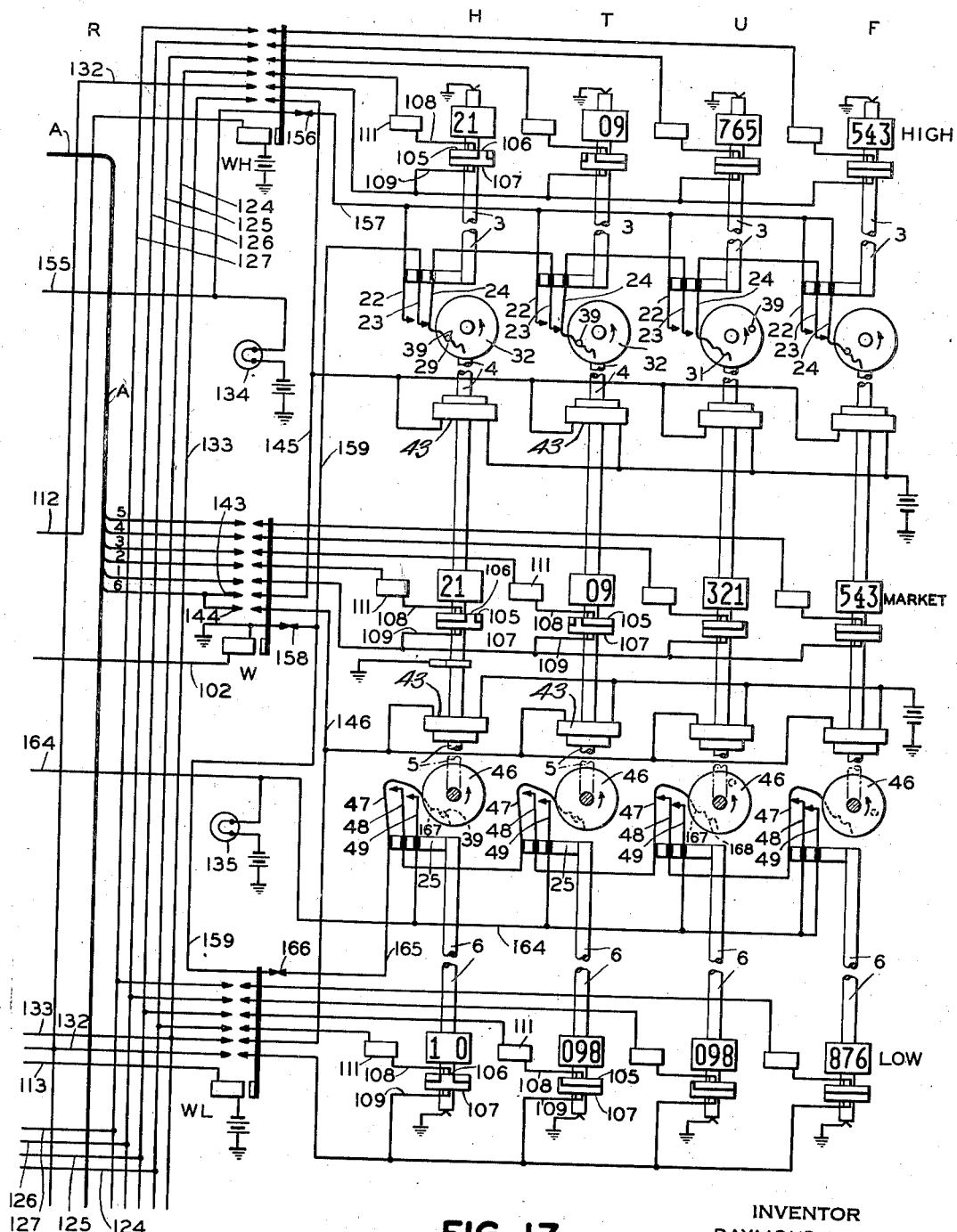

Reference will now be had to Figs. 16 and 17 which disclose a system for comparing the market price of a stock or other item with two previously determined values of the stock. The system comprises a transmitting station T, Fig. 16, and a receiving station R, Fig. 17, connected thereto whereby the prices of a selected stock are displayed upon Market indicators in accordance with signals transmitted from the apparatus within the transmitting station.

Fig. 16 also shows the selecting and transmitting equipment for controlling the operation of the High and Low indicators of the comparing device shown on Fig. 17. The manner in which these indicators operate and coact with the Market indicator to signal the clerk when the market price has equalled or passed the one or the other of the prices set up on the High and Low indicators will now be described.

The operator's equipment comprises a manually controlled selector 100 for selecting the indicators of a stock upon which the market price is to be posted. This selector has a movable arm 101 settable to any one of a plurality of positions in accordance with the stock to be selected. When set in a selected position, the arm 101 engages a contact 141 thus establishing a circuit from the arm 101 over one of the lines 102 to the winding of the selected stock relay as, for example, the relay W, Fig. 17. The indicator operating impulses are transmitted by any suitable form of transmitter, as for example, the telephone dials, RES, H, T, U and F and the relays PRES, PH, PT, PU, and PF. As these dials operate, they cause the pulsing relays PRES, PH, PT, PU and PF to operate and transmit impulses to the windings of the Market indicators of the selected stock over conductors 2, 3, 4 and 5 of cable A. The key 142 is connected to conductor 6 of cable A and upon operation causes the circular magnets 43 of the Market indicators to become energized and attract their associated pins 39. A switch SW in series with the selector 100 controls the operation of the selected stock relay.

Figure 18:
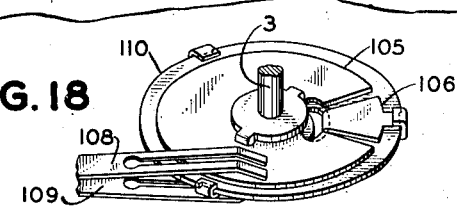
Fig. 18 is a view in perspective of the commutator shown in Figs. 4 and 5.

Each of the indicator units of Fig. 17 is provided with a commutator having a grounded segment 105 and a segment 106, Figs. 4, 5 and 18 in electrical circuit with the continuous disc 107, but insulated from the segment 105 by the insulating disc 110, so that the brushes 108 and 109 are connected together electrically when brush 108 is in engagement with segment 106 as the indicator unit moves into the blank position. Whenever the indicator unit is moved from its normal position, the electromagnet 111 is connected by way of brush 108 to the grounded segment 105 of the commutator.

The clerk's equipment comprises a set of selection keys for the High (sell) and a duplicate set of keys for the Low (buy) indicators of the various stocks. A common key C releases any of the operated keys of the keyset. The depression of any key of the High group of keys connects ground to a conductor 112 and operates a selecting relay as WH thereby selecting the High indicators of a desired stock for operation. Similarly the depression of any key of the Low group of keys grounds a conductor 113 and operates the selecting relay as WL for the Low indicators of a desired stock. Whenever any selection key of the keyset is depressed, the key lock mechanism 114 is moved against the tension of spring 115 and releases any other operated key of the keyset. As the key completes its downward movement, the locking mechanism 114 is restored by the spring 115 and retains the key in the operated position. Whenever the key locking mechanism 114 is operated, the insulated portion 120 thereof causes the switch 116 to open its contacts and remove ground from conductor 130 to release any of the relays CH, CT, CU or CF which may have been held operated to the grounded switch contacts.

The clerk's equipment also includes the keys H, T, U and F and associated relays CH, CT, CU and CF respectively for selecting the digits of the price to be set up on the High and Low indicators by the clerk. A telephone dial P closes its contacts 117 in accordance with the movement of the dial thereby operating the pulsing relay PR. The relay PR applies battery at its armature 118 and contact 119 to the conductor 121, the armature 122, 152, 153, 154 and make contacts of each of the operated relays CH, CT, CU and CF and thence to the selected ones of conductors 124, 125, 126 and 127 to the electromagnets 111 of the Low indicators of the selected stock to cause these to operate in accordance with the price signals to be transmitted.

The clerk's equipment also includes a switch 128 adapted to engage the contacts 129 and 131 thereof and to thereby apply ground to the lines 132 and 133 respectively extending to contacts of the selection relays for the High and Low indicators. The conductor 132 is employed to move the High and Low indicators from their normal positions and conductor 133 is employed to operate the circular magnets 104.

Each stock has two alarm relays individual thereto, which relays are operated whenever the price displayed on the Market indicators has equaled or passed the prices displayed on the High or Low indicators of the stock. Referring to Fig. 16 the High alarm relay WHA for the stock W is operated whenever the price set up on the Market indicators of the stock W has equaled or passed the price set up on the High indicators. Similarly the Low alarm relay WLA, Fig. 16, is operated whenever the market price of the stock W equals or passes the price set up on the Low indicators thereof.

The operation of relay WHA causes the bell 132 to operate and thus indicate to the clerk that the market price has equaled or passed the high or sell price. Similarly the operation of the relay WLA operates the bell 133 to indicate that the market price has equaled or passed the price set up on the Low indicators. The operation of any High alarm relay, as for example relay GMHA for the stock GM, causes the operation of the bell 132, whereas the operation of any Low relay such as GMLA operates the bell 133. Associated with each stock, as clearly shown on Figs. 3 and 17, are two alarm lamps 134 and 135 which operate whenever the appropriate alarm relay is operated. Lamp 134 when lighted indicates to the clerk, whose attention may have been attracted by the operation of the bell 132, that the market price of the stock has equaled or passed the price set up on the High indicators thereof. This lamp may be extinguished at will by depressing the button 136 which causes the switch contacts 137 to open and remove ground from one side of the lamp after the High indicators have been reset to a price higher than the market price. In a similar manner, the depression of the push button 138 opens the switch contacts 139 and extinguishes the lamp 135. The bells 132 and 133 have distinctive tones so that the operator may readily ascertain by the sound of the bell whether the price set up on the Market indicators has reached the prices set up on the High or Low indicators.

The operation of the system will be best understood by consideration of a specific example. Assume that the operator desires to post the quotation W102½ and the clerk wishes to set up on the High indicators for the stock W the quotation 106½ and the quotation 97⅞ upon the Low indicators of this stock.

The operator at the transmitting station T first moves the selector 100 until the arm 101 thereof is in engagement with the appropriate segment 141 to select the stock W. The operator then closes the switch SW thereby completing the circuit from battery, switch SW, arm 101 of the selector 100, terminal 141, conductor 102, winding of relay W and thence to ground. Relay W operates over this circuit and the Market indicators of the stock W are now selected for operation.

The key 142 is depressed and the dial RES is operated to transmit 10 impulses to the relay PRES which operates each time the dial contacts close. The operation of key 142 applied ground to conductor 6 of cable A, closed contacts 143 and 144 of relay W, conductors 145 and 146 to the windings of the upper and lower magnets 104 in parallel from whence the circuit is continued to battery thereby energizing these magnets and withdrawing the pins 39 from engagement with the springs 24 of the High indicator units and the springs 47 of the Low indicator units during the time that the Market indicators are operating to their normal positions.

Relay PRES transmits 10 impulses from battery through its armature 147 and make contact of relay PRES, conductor 2 of cable A, closed contacts of relay W to the winding of electromagnet 111 of the hundreds Market indicator from whence the circuit is continued through brush 108 to the grounded segment 105 of the commutator. The indicator is advanced one step as each impulse is received until the indicator moves into the blank position thereby disengaging the brush 108 from the grounded segment 105 and engaging the brush with the segment 106 of the commutator. Since segment 106 is ungrounded at this time, the indicator remains in the normal position. In a similar manner armatures 148, 149 and 150 of relay PRES complete circuits over conductors 3, 4 and 5 of cable A to the electromagnets 111 of the tens, units and fractions Market indicators which are restored to normal concurrently with the hundreds indicator in the manner just described.

After the restoration dial RES has returned to normal, the key 142 is released thereby removing ground from conductor 6 of cable A and deenergizing the magnets 104 thus causing the pins 39 to assume their normal positions. The operator now depresses key 103 which grounds conductor 1 of cable A, operated contacts of relay W, brush 109, commutator segments 107 and 106, brush 108 and one end of the winding of the electromagnet 111 of each of the Market indicators thereby conditioning these indicators for operation from their normal positions.

It will be recalled that the operator is about to transmit the price 102½. While the key 103 maintains ground on the windings of the selected indicator units, the operator transmits one pulse from the dial H, thereby momentarily operating relay PH from battery through the contacts of the dial H and the winding of relay PH to ground. The operation of relay PH caused its armature 160 to move into engagement with the contact thereof and apply battery to conductor 2 of cable A, contacts of relay W and thence to one end of the winding of electromagnet 111 of the hundreds Market indicator unit causing this unit to be stepped ahead to display the digit 1.

The operator now transmits 10 impulses from the dial T, 2 impulses from the dial U and 4 impulses from the dial F in a similar manner with the key 103 depressed during transmission of at least the first of each series of digit impulses, thereby causing the operation of relays PT, PU and PF to transmit the appropriate number of impulses over conductors 3, 4 and 5 of cable A to the tens, units and fractions Market indicators to cause these to take settings 0, 2 and 4 respectively. The operator now opens the switch SW thereby releasing relay W and the transmission of this quotation is now complete.

The clerk selects the High indicators of the stock W by depressing the key W of the High set of keys. With this key operated, ground is placed on conductor 112 thereby operating relay WH. The keys H, T, U and F are momentarily depressed thereby operating relays CH, CT, CU and CF respectively. Each of these relays locks by way of its armature 148 and make contact, conductor 149, switch contacts 151, conductor 130, switch contacts 116 to ground and remain so locked until ground is removed from their windings either by depressing the digit release key DR to open the switch contacts 151 or by depressing either another selection key or the common selection release key C of the keyset, thereby operating the switch contacts 116. The switch 128 is moved into engagement with its terminal 131, thereby applying ground to conductor 133 through operated contacts of relay WH to the windings of the upper circular magnets 43 which become energized and move the pins 39 out of engagement with the springs 24 of the High indicator units. The clerk now dials 10 impulses by means of the dial P which closes its contacts 117 repeatedly and operates the pulsing relay PR to transmit 10 impulses to the selected High indicator units in the following manner: Battery, armature 118, contact 119 of relay PR, conductor 121, armature 122 and contact 123 of relay CH, conductor 124, contacts of relay WH, electromagnet 111 of the hundreds High indicator unit, brush 108 to grounded segment 105 of the commutator. The hundreds indicator unit is thus restored to normal.

Referring to Fig. 16, it will be noted that the conductor 121 is extended to armatures 152, 153 and 154 of relays CT, CU and CF respectively. As these relays are now operated, battery impulses on conductor 121 are transmitted over conductors 125, 126 and 127 through contacts of relay WH, windings of the tens, units and fractions High indicator units, thereby restoring these units to normal concurrently with the restoration of the High hundreds indicator unit during the time that the dial P was returning to normal. The clerk now momentarily depresses the push button DR, thereby releasing relays CH, CT, CU and CF. The key H is momentarily operated thereby reoperating relay CH which locks by way of its armature 148 and makes contact to the grounded conductor 149. The switch 128 is moved into engagement with terminal 129. As the switch 128 left terminal 131, ground was removed from conductor 133 deenergizing the upper magnets 43 thereby restoring the pins 39 of the High indicator units. As the switch 128 engaged terminal 129 it placed ground on conductor 132, contacts of relay WH, brush 109, segments 107 and 106 of the commutator, brush 108 to one end of the winding 111 of the hundreds, tens, units and fractions High indicator units. In the assumed example, it will be recalled that the clerk desired to post the price of 106½ High for the stock W. The clerk transmits one impulse from the dial P, thereby operating the relay PR to place battery on conductor 121 through the armature 122 and contact 123 of relay CH and conductor 124, thereby operating the hundreds High indicator unit to display the digit 1.

Button DR is momentarily operated thereby releasing relay CH. The key T is now operated, thereby operating relay CT which locks at its armature 148 and makes contact to grounded conductor 149. The clerk now transmits 10 impulses from the dial P, thereby causing the pulsing relay PR to send 10 impulses over the conductor 121, armature 152 and make contact of relay CT to conductor 125, thereby operating the tens High indicator unit to display the digit 0. After the High indicator has taken its setting, the button DR is momentarily operated to release the relay CT.

In like manner, the key U is depressed and the dial P operated to send 6 impulses to the High units indicator unit after which the button DR is operated and the key F and dial P are operated in the order named to transmit 4 impulses to the fractions indicator to display the digit 4 corresponding to the fraction ½. The button DR is operated and the switch 128 is disengaged from contact 129 at the completion of the operations just described.

The setting up of the price 99⅞ by the clerk upon the Low indicators of the stock W is accomplished by depressing the W key of the Low group of keys which causes the operation of relay WL and restores any other operated selection key of the keyset and effects the release of a selection relay such as WH. The movement of the switch locking mechanism 114 as the key W of the Low group was depressed, opened the switch contacts 116 and released any of the relays CH, CT, CU or CF which may have been locked thereto. The restoration and actuation of the Low indicators is accomplished in a manner similar to the operation of the High indicator units and will not, therefore, be described in detail. It will be noted, however, that inasmuch as the Low price of 99⅞ does not include a hundreds digit, the H key of the clerk's transmitting apparatus is not depressed after the switch 128 has been moved into engagement with contact 129, but the keys T, U and F are employed to control the operation of the tens, units and fractions Low indicator units. In the event that another price is not to be set up immediately, the key C is operated to release the locked selection key and the selection relay to condition the alarm circuits for operation.

Since the Market price of 102½ does not equal or exceed the High price of 106½ nor is equal to or lower than the Low price of 99⅞, obviously no indication is given to the clerk of buy or sell orders to be executed at this time.

Referring now to Fig. 17, the setting of the hundreds indicator unit of the High price is the same as the setting of the corresponding indicator of the Market price and the hundreds pin 39 therefore will be in engagement with the spring depression 29 and the spring 24 is forced outwardly against spring 23 of the High hundreds indicator unit.

Since the tens digit 0 of the market price is the same as the High tens digit, the tens pin 39 is in engagement with the spring depression 29 and the springs 24 and 23 of the High tens indicator unit are in electrical contact with each other. The units digit 2 of the market price is numerically less than the units digit 6 of the High price and the units pin 39 therefore assumes the position shown on Fig. 17 whereby springs 23 and 24 do not close their respective contacts. The fraction digit 4 of the market price coincides with the fraction digit of the High price and the springs 23 and 24 of the High fractions indicator unit are therefore in electrical contact with each other.

The alarm circuit for the operation of relay WHA will now be described: Battery, winding of relay WHA, conductor 155, break contacts 156 of relay WH, conductor 157, springs 24 and 23 of the High fractions indicator unit, springs 24 and 23 of the units, tens and hundreds High indicator units respectively, break contact 158 of relay W to ground. It will be noted that this circuit is effective only when relays WH and W are unoperated and the spring 24 of each of the High indicator units is in electrical contact with its associated spring 23. Since the units pin 39 has not forced the spring 24 of the High units indicator into engagement with its associated spring 23, the alarm circuit is not completed at this point and no alarm will be given. The circuit just described is effective only when the market price is the same as the price set up on the high indicator units and the relays WH and W are released.

The operation of the High alarm when one digit of the Market price is higher than a corresponding digit of the High price and the digits of a higher order of the market price are the same respectively as those of the High price, will be best understood by reference to a specific example illustrating this condition.

Assume, by way of example, that the settings of the High indicators correspond to the price 106½ and the market settings are 107⅛. It will be noted that the hundreds digits of the High and Market prices are the same and the tens digits are likewise the same, but the units digit setting of the market indicator is numerically greater by one than the corresponding setting of the units High indicator, where as the fractions digit of the market price is lower than the fractions digit of the High price setting. As, in the example assumed, the hundreds and tens digits of the High price equal the hundreds and tens digits respectively of the market price, the springs 23 and 24 of the hundreds and tens High indicator units will be in engagement with one another. Since, however, the units digit 7 of the market price is numerically greater than the units digit 6 of the High price, the units pin 39 will be in engagement with the spring depression 31 and the springs 24 and 23 of the units High indicator will be in contact with one another and with the spring 22. Since the fractions digit 1 of the market price is numerically less than the fractions digit 4 of the High price, none of the springs 22, 23 or 24 of the High fractions indicator will be in engagement with one another.

The relay WHA will now be operated over the following circuit: Battery, winding of relay WHA, conductor 155, break contacts 156 of relay WH, conductor 157, spring 22 and spring 23 of the High units indicator, springs 24 and 23 of the High tens, springs 24 and 23 of the high hundreds indicators, conductor 159, break contacts 158 of relay W to ground.

Relay WHA locks over its armature 161 and contact thereof to ground at the switch contacts 137. Relay WHA also moved its armature 162 against its contact, thereby applying battery to the switch 163 and the winding of the bell 132, thus operating the bell 132 as an indication of this condition to the clerk who may, if he so desires, disconnect the bell by opening the switch 163 or depressing the button 136 to release the relay WHA after the High indicators have been reset to a value higher than the market price. When the alarm circuit was established to place ground on conductor 155, lamp 134 was lighted to indicate to the clerk the stock relating to the limit order which requires execution. The release of relay WHA at its armature 161 removed ground from conductor 155 and extinguished the lamp 134 provided the High indicators had been set to a value numerically greater than the Market indicators. Referring to Fig. 16, it will be noted that the armatures 162 of all High alarm relays such as WHA, GMHA and the like are all connected together so that the operation of any one of these relays causes the bell 132 to indicate that a sell order is to be executed.

When the settings of the Low and Market indicators are the same, the pin 39 engages the spring depression 167, Fig. 8, forcing the springs 47 and 48 away from spring 49 with springs 47 and 48 remaining in electrical contact with each other. The Low alarm relay WLA operates over the following circuit: Battery, winding of relay WLA, conductor 164, spring 48 of the Low fractions indicator and its associated spring 47, springs 48 and 47 of the Low units, tens and hundreds indicators respectively, conductor 165, break contacts 166 of relay WL, conductor 159, break contacts 158 of relay W to ground.

Referring to Fig. 17, it will be noted that the hundreds digit 1 of the market price is numerically greater by one than the setting of the hundreds Low indicator and the hundreds pin 39, therefore, will engage the spring depression 168, Fig. 9, thereby forcing the spring 47 out of contact with spring 48 and also out of contact with spring 49. The grounded conductor 165 applies ground to spring 47 of the hundreds Low indicator unit, but since, as before stated, the hundreds digit setting of the Market indicator is numerically greater than the hundreds digit set up on the Low indicator, the spring 47 is not in engagement with spring 48 of this indicator and the alarm circuit is opened at this point. Since the setting of the Low tens indicator unit is one digit numerically less than the Market tens indicator unit setting, the alarm circuit is additionally open at spring 47 of the Low tens indicator unit. Since the units and fractions digits of the Low indicator units are each higher than the units and fractions Market indicator units respectively, the pin 39 will not be in engagement with either spring depression 167 or 168 of these units, and the springs 47, 48 and 49 of these units will be in contact with one another as shown on Fig. 8 of the drawings.

Assume now that the price set up on the Market indicators is 99⅞, which is the same as the price set up on the Low indicators, the hundreds digit being blank. Under these conditions the springs 47 and 48 of the Low indicators will all be in engagement with one another and disengaged from their springs 49. The alarm circuit will then be completed through the contacts 47 and 48 of each of the Low indicator units in series and the relay WLA will operate and lock through its armature 168 and make contact to the grounded switch contacts 139. The lamp 135 will be lighted to indicate to the attendant the stock to which a buy order relates that requires execution.

The operation of relay WLA caused the bell 133 to ring over the following circuit: Battery, contact and armature 169 of relay WLA, switch 171, and bell 133 to ground. The button 138, when depressed, operates the switch contacts 139 and releases relay WLA, thereby extinguishing the lamp 135 and interrupting the circuit to the bell 133 which causes the bell to cease its operation provided the Low indicators have been reset to a number numerically less than the number displayed on the Market indicators. The armature 169 of relay WLA is connected to the corresponding armature of relay GMLA and all other Low alarm relays so that the operation of any Low alarm relay causes the bell 133 to ring with the switch 171 closed. The switch 171 is provided to disconnect the bell 133 whenever the clerk may so desire, as for example, when several Low alarm relays are operated at the same time as may occur during a sustained downward movement of the market. The switch 163 is employed to render the operating circuit for the bell 132 ineffective. The lamps 133 and 134 are distinctive in color or provided with different colored lamp caps, as for example, the High lamps 134 may emit a red light and the Low lamps 135 may give a green indication when lighted. The clerk is thus enabled to determine at a glance whether the order for a stock to be executed is a buy order, a sell order or whether both buy and sell orders for the stock are awaiting execution.

Figure 12:
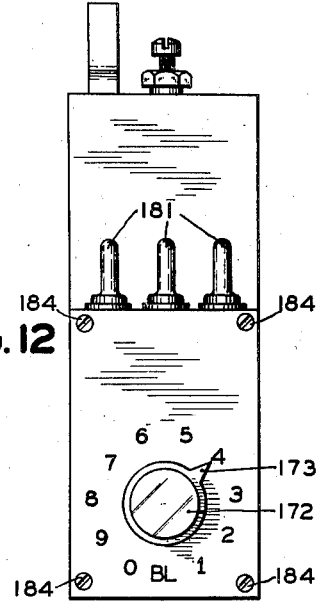
Fig. 12 shows a modification of the comparing device of Fig. 1.
Figure 14:
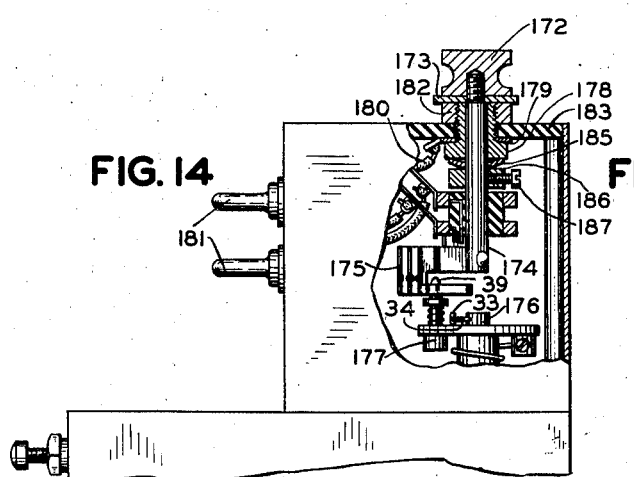
Fig. 14 is a fragmentary view partly in section of the device taken along the line 14—14 of Fig. 13.
Figure 13:
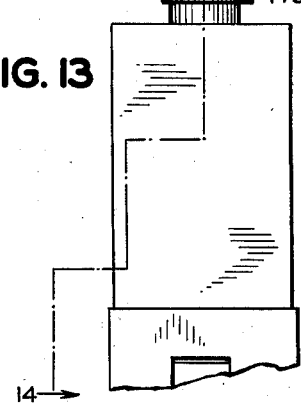
Fig. 13 is a front view of the device shown on Fig. 12.

A modified form of comparing unit is shown in Figs. 12, 13, and 14 wherein the High indicator of Fig. 1 has been replaced by a manually settable knob 172 having attached thereto a pointer 173. This pointer enables the shaft 174 to be set in any of the positions 1 to 0 and blank, as for example, the position 4 shown on Fig. 12. Mounted on the shaft 174 is a spring assembly 175 which is similar to the assembly of springs 22, 23 and 24 of Fig. 6, except that the insulating washer 30 is replaced by a metal washer. This arrangement causes the spring 22 to be in continuous electrical circuit with the screw 26, the arm 25 and the shaft from whence the circuit is continued through the bearing 118, Fig. 14, the terminal washer 179 and associated conductor 180 to one of the slip connection terminals 181. The use of the shaft 174 in the circuit of one of the springs of the assembly 175 provides a cheaper construction than the arrangement of Fig. 10 by eliminating one of the slip rings and wiper brushes of Fig. 10. The manner of connecting the remaining springs of the assembly 175 to the slip rings and brushes is shown on Fig. 10.

The bearing 178 is held clamped by the nut 182 to the plate 183 which is secured to the unit by the screws 184. The plate 183 may be of suitable insulating material and the shaft is thus insulated from the frame of the unit by the plate or by any other suitable means.

A spring washer 185 interposed between the lower portion of the bearing 178 and the collar 186 maintains the shaft 174 in any of its set positions. The collar 186 is provided with a screw 187 for clamping the collar securely to the shaft and against the spring washer 185.

The shaft 176 supports and carries with it the pin 177 which is similar to the pin 39 shown on Fig. 1 and operates in a manner similar to the operation of the pin 39 during the restoration of the Market indicator to the blank position. The comparing unit is provided with slip connection terminals 181 which engage suitable complementary slip connections whereby the unit may be readily removed from the framework within which the units are normally mounted adjacent to one another in a horizontal row to display the price set up on the indicators controlling the operation of the shaft 176, and also the price indicated by the pointers 173 of the units corresponding to the digits of the price. The indicators employed with this comparator unit for controlling the operation of the pin 177 may be the Market indicator shown on Fig. 1 which is operated by electrical impulses from a transmitter at a distance. The Market indicator is selectable by a relay such as the relay W of Fig. 17 wherein a selecting relay is shown individual to each stock or item to be selected. The circuit through the contacts of the spring assembly 175 is indicated on Fig. 17 for the springs 22, 23 and 24 of the High indicators.

The operation of this comparing unit will best be understood with reference to a specific example. Assume that the attendant has set the pointers 173 of the hundreds, tens, units and fractions comparing units to the positions 1, 0, 6 and 4 respectively corresponding to the number 106½ and that the shafts 176 of the hundreds, tens, units and fractions indicators are set to display the price 102½ on their respective indicators. The alarm circuit corresponding to the settings of the pointers and indicators in the assumed example is as shown on Figs. 16 and 17 for the High indicators and no alarm indication will be given at this time. If, however, the market indicators should be given a setting numerically equal to or higher than the settings of the pointers, an alarm will be given in a manner similar to that previously described in connection with the High indicators of Fig. 17 when the same relation exists between the two numbers representing the High and Market prices to be compared.

Figure 15:
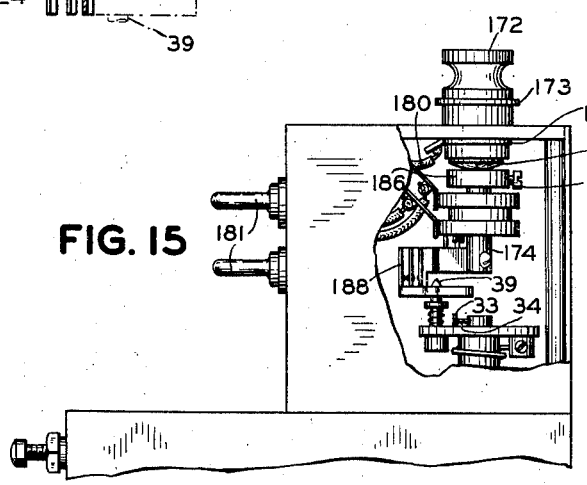
Fig. 15 is a fragmentary view of another comparing device.

Fig. 15 shows a comparing unit similar in all respects to the comparing unit of Fig. 14 except the spring assembly 175 of Fig. 14 is replaced by the assembly 188, the springs of which are similar to the springs 47, 48 and 49 of Fig. 8. The operation of this comparing unit is similar to that just described for the comparing unit of Fig. 14 except that an alarm would be given when the numerical value of the pointers was equal to or greater than the numerical value set up on the indicators. The circuit for this alarm is shown on Figs. 16 and 17 for indicating to the clerk when a buy order is to be executed.

The indicators of the comparing units of Figs. 14 and 15 may be operated in parallel or in any other suitable manner whereby the market price set up on the drums of these indicator units is the same as the price last transmitted by the operator at the transmitting station T for the item.

It will be understood that there may be two sets of comparator units for each of the numbers to be compared, one set of which employs the springs 47, 48 and 49 used with the device of Fig. 15 and the other, the springs 22, 23 and 24 used with the device of Fig. 14, the first of said sets giving a signal in the manner of the low indicators and the second giving a signal in the manner of the High indicators of Fig. 17.

While the invention has been described in detail with respect to a certain preferred example thereof which gives satisfactory results, it will be understood by those skilled in the art after understanding the invention, that various changes and modifications may be made without departing from the spirit and scope of the invention and it is intended, therefore, in the appended claims to cover all such changes and modifications.

What is claimed as new and desired to be secured by Letters Patent is:

1. In a numerical comparator, a plurality of settable circuit controlling contact means representative of a first number, one individual to each of a plurality of items, a set of indicia bearing devices for operating said contact means, a set of settable pins operable to engage said contact means, a second set of indicia bearing devices for operating said pins to settings representative of a second number, the said indicia bearing devices of both sets having a home position and a plurality of moved positions, means for operating said indicia bearing devices to their home positions and moved positions, means controlled at will for operating said pins during the movement of the indicia devices to their home positions whereby said pins are disengaged from said contact means, additional means for causing said pins to engage said contact means as the indicia bearing devices are moved to their settings representative of a predetermined value, and means including said contact means for indicating the numerical relation of the numbers represented by said contact means and said pins respectively.

2. In a numerical comparator, a set of rotatable spring assemblies settable in accordance with the digits of a number representative of a predetermined price of a stock or other item, said spring assemblies each comprising a first pair of contacts and a second pair of contacts, a plurality of rotatable pins settable in positions representative of a second number corresponding to an instant price of the item and adapted to close the first pair of contacts of the spring assemblies when the digits of the predetermined price are the same as the corresponding digits of the instant price and adapted to close both pairs of contacts of one of the spring assemblies when any digit of the predetermined price is less than the corresponding digit of the instant price, and means controlled by said contacts to indicate when the instant price is numerically equal to or greater than the predetermined price.

3. A quotation system for a plurality of items, comprising a plurality of associated means each individual to one of said items and selectively operable in accordance with a predetermined value of the item, means common to said associated means and responsive to item selection signals for selecting any of said devices for operation, said means comprising a plurality of rotatable shafts having cam elements mounted thereon, means for setting said shafts in accordance with the current value of the item, a plurality of circuit controlling spring assemblies settable in accordance with the high and low values of the item and adapted to be engaged by said cam elements when the current price settings of the cam elements is the same as the settings of the spring assemblies for the high and low values, and circuit connections including a signal device operable by said spring assemblies when the price settings of the cam elements has equaled or passed the settings of the spring assemblies representative of the high and low values.

4. In a numerical comparator, a plurality of storage devices each operable in accordance with a predetermined numerical value of an item, each of said devices comprising a series of normally closed companion contact spring assemblies, means operable in accordance with a second value of the item, said means comprising a set of rotatable pins adapted to engage one contact spring of each of the said spring assemblies and disengage it from its companion contact when the settings of the spring assemblies are the same as the settings of the pins, an indicating device individual to each item, a second indicating device common to a plurality of items, and circuit connections controlled by the other contacts of the spring assemblies for operating the said first and second indicating devices when the settings of the pins are the same as the settings of the corresponding spring assemblies.

5. A system for automatically comparing the instant prices of stocks or other items, which fluctuate in value, with predetermined prices of the items, comprising a receiver having a plurality of storage means each individual to one of said stocks or other items, means including a first transmitter operable at a distance from said receiver for selecting the storage means corresponding to any desired item and for actuating the selected storage means to a setting in accordance with the instant price of the item, said receiver also including other storage means each individual to one of said stocks or other items for storing a predetermined price of said item, means including a second transmitter operable at a distance for selecting any of said other storage means corresponding to the desired item and for operating the last named storage means to a setting corresponding to a predetermined price of the selected item, means controlled jointly by the first named storage means and said other storage means for comparing the predetermined price with the instant price of the selected item, and signal means for indicating the numerical relation of the prices thus compared.

6. A system for automatically comparing the instant prices of stocks or other items, which fluctuate in value, with predetermined prices of the items, comprising a receiver having a plurality of storage means each individual to one of said stocks or other items, said storage means including rotatable pins which move to different positions in accordance with the settings of the storage means, means including a first transmitter operable at a distance from said receiver for selecting the storage means corresponding to any desired item and for actuating the selected storage means and said pins to settings in accordance with the instant price of the item, said receiver also including other storage means each individual to one of said stocks or other items for storing predetermined high and low prices of said item, said other storage means including rotatable members which move to different positions in accordance with the settings of said other storage means, means including a second transmitter operable at a distance for selecting any of said other storage means corresponding to the desired item and for operating the last named storage means and rotatable members to settings corresponding to predetermined high and low prices of the selected item, means controlled jointly by said rotatable pins and rotatable members for comparing the predetermined prices with the instant price of the selected item, and signal means for indicating the numerical relation of the prices thus compared.

RAYMOND M. HICKS.